US009005492B2

(12) United States Patent
Chang et al.

(10) Patent No.: US 9,005,492 B2
(45) Date of Patent: Apr. 14, 2015

(54) METHODS FOR MAKING SILICONE HYDROGEL LENSES FROM WATER-BASED LENS FORMULATIONS

(75) Inventors: Frank Chang, Suwanee, GA (US); Lynn Cook Winterton, Alphretta, GA (US)

(73) Assignee: Novartis AG, Basel (CH)

( * ) Notice: Subject to any disclaimer, the term of this patent is extended or adjusted under 35 U.S.C. 154(b) by 355 days.

(21) Appl. No.: 12/963,685

(22) Filed: Dec. 9, 2010

(65) Prior Publication Data

US 2011/0140292 A1  Jun. 16, 2011

Related U.S. Application Data

(60) Provisional application No. 61/286,171, filed on Dec. 14, 2009.

(51) Int. Cl.
  B29D 11/00   (2006.01)
  G02B 1/04    (2006.01)
(52) U.S. Cl.
  CPC .......... *G02B 1/043* (2013.01); *B29D 11/00038* (2013.01); *B29D 11/00048* (2013.01)
(58) Field of Classification Search
  CPC .................... B29D 11/00038; B29D 11/00048
  USPC ....................................................... 264/1.32
  See application file for complete search history.

(56) References Cited

U.S. PATENT DOCUMENTS

| | | | |
|---|---|---|---|
| 3,408,429 A | 10/1968 | Wichterle |
| 4,136,250 A | 1/1979 | Mueller |
| 4,153,641 A | 5/1979 | Deichert |
| 4,182,822 A | 1/1980 | Chang |
| 4,189,546 A | 2/1980 | Deichert |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,276,402 A | 6/1981 | Chromecek |
| 4,312,575 A | 1/1982 | Peyman |
| 4,327,203 A | 4/1982 | Deichert |
| 4,341,889 A | 7/1982 | Deichert |
| 4,343,927 A | 8/1982 | Chang |
| 4,347,198 A | 8/1982 | Ohkada |
| 4,355,147 A | 10/1982 | Deichert |
| 4,444,711 A | 4/1984 | Schad |
| 4,460,534 A | 7/1984 | Boehm |
| 4,486,577 A | 12/1984 | Mueller |
| 4,543,398 A | 9/1985 | Bany |
| 4,605,712 A | 8/1986 | Mueller |
| 4,632,844 A | 12/1986 | Yanagihara |
| 4,661,575 A | 4/1987 | Tom |
| 4,684,538 A | 8/1987 | Klemarczyk |
| 4,703,097 A | 10/1987 | Wingler |
| 4,833,218 A | 5/1989 | Lee |
| 4,837,289 A | 6/1989 | Mueller |
| 4,954,586 A | 9/1990 | Toyoshima |
| 4,954,587 A | 9/1990 | Mueller |
| 5,010,141 A | 4/1991 | Mueller |
| 5,034,461 A | 7/1991 | Lai |
| 5,039,761 A | 8/1991 | Ono |
| 5,070,170 A | 12/1991 | Robertson |
| 5,079,319 A | 1/1992 | Mueller |
| 5,346,946 A | 9/1994 | Yokoyama |
| 5,358,995 A | 10/1994 | Lai |
| 5,387,632 A | 2/1995 | Lai |
| 5,416,132 A | 5/1995 | Yokoyama |
| 5,451,617 A | 9/1995 | Lai |
| 5,486,579 A | 1/1996 | Lai |
| 5,508,317 A | 4/1996 | Müller |
| 5,760,100 A | 6/1998 | Nicolson |
| 5,789,464 A | 8/1998 | Müller |
| 5,843,346 A | 12/1998 | Morrill |
| 5,849,810 A | 12/1998 | Müller |
| 5,894,002 A | 4/1999 | Boneberger |
| 5,962,548 A | 10/1999 | Vanderlaan |
| 5,981,675 A | 11/1999 | Valint, Jr. |
| 6,039,913 A | 3/2000 | Hirt |
| 6,367,929 B1 | 4/2002 | Maiden |
| 6,627,124 B1 | 9/2003 | Herbrechtsmeier |
| 6,719,929 B2 | 4/2004 | Winterton |
| 6,762,264 B2 | 7/2004 | Künzler |
| 6,822,016 B2 | 11/2004 | McCabe |
| 7,091,283 B2 | 8/2006 | Müller |
| 7,201,481 B2 | 4/2007 | Rosenzweig |

(Continued)

OTHER PUBLICATIONS

PCT International Search Report dated Feb. 2, 2011, International Application No. PCT/US10/59616, International Filing Date Dec. 9, 2010.

(Continued)

*Primary Examiner* — Yogendra Gupta
*Assistant Examiner* — Robert J Grun
(74) *Attorney, Agent, or Firm* — Jian Zhou

(57) ABSTRACT

Described herein are methods for producing silicone hydrogel lenses. The methods involve introducing into a mold a water-based lens-forming composition, curing the lens-forming composition in a mold to form the lens, and removing the lens from the mold. The lens-forming composition comprises (i) a polysiloxane-containing vinylic monomer or macromer, (ii) at least one hydrophilic vinylic monomer, (iii) a surfactant, and, and (iv) water. The surfactant is polysiloxane-containing surfactant that is free of actinically-polymerizable groups and is a copolymer having from about 10% to about 40% by weight of one or more polysiloxane segments and from about 90% to about 60% by weight hydrophilic units and/or segments. The methods permit the use of water as a solvent and reduce the need for organic solvents. Additionally, the lenses produced by the methods can have improved properties such oxygen permeability.

20 Claims, No Drawings

(56) References Cited

U.S. PATENT DOCUMENTS

| | | |
|---|---|---|
| 7,238,750 B2 | 7/2007 | Müller |
| 7,268,189 B2 | 9/2007 | Müller |
| 7,521,519 B1 | 4/2009 | Hirt |
| 7,858,000 B2 | 12/2010 | Winterton |
| 2006/0012751 A1* | 1/2006 | Rosenzweig et al. ..... 351/160 R |
| 2008/0015315 A1 | 1/2008 | Chang |
| 2008/0143003 A1 | 6/2008 | Phelan |
| 2008/0143958 A1 | 6/2008 | Medina |
| 2008/0174035 A1 | 7/2008 | Winterton |
| 2008/0231798 A1 | 9/2008 | Zhou |
| 2008/0234457 A1* | 9/2008 | Zhou et al. ....................... 528/25 |
| 2009/0005528 A1* | 1/2009 | Fujisawa et al. .............. 526/279 |
| 2009/0143499 A1 | 6/2009 | Chang |
| 2009/0190090 A1* | 7/2009 | Hung et al. ................ 351/160 H |
| 2010/0120938 A1 | 5/2010 | Phelan |
| 2010/0296049 A1 | 11/2010 | Justynska |
| 2010/0298446 A1 | 11/2010 | Chang |
| 2011/0063567 A1* | 3/2011 | Domschke et al. ........ 351/160 H |

OTHER PUBLICATIONS

PCT Written Opinion of the International Searching Authority dated Feb. 2, 2011, International Application No. PCT/US10/59616, International Filing Date Dec. 9, 2010.

Authors: Yu-Chin Lai, Richard Ozark, Edmond T. Quinn Name of Article: Synthesis and Characterization of HB-Polydimethylsiloxanes Published in: Journal of Polymer Science: Part A: Polymer Chemistry, 1995, vol. 33, pp. 1773-1782.

* cited by examiner

METHODS FOR MAKING SILICONE HYDROGEL LENSES FROM WATER-BASED LENS FORMULATIONS

This application claims the benefit under 35 U.S.C. §119 (e) of U.S. provisional application Ser. No. 61/286,171 filed Dec. 14, 2009, herein incorporated by reference in its entirety.

BACKGROUND

In recent years, soft silicone hydrogel contact lenses are increasingly becoming popular because of their high oxygen permeability and comfort. However, a lens formulation for making silicone hydrogel contact lenses generally comprises at least one silicone-containing vinylic monomer or macromer. Since the silicone-containing vinylic monomer or macromer used in the lens formulation contains a significant number of hydrophobic segments, the use of an organic solvent is necessary in order to produce a transparent formulation prior to curing. The use of organic solvents provides a number of challenges when producing contact lenses. For example, the organic vapors generated during lens production can raise safety concerns. Thus, it would be desirable to have a procedure that does not require the use of organic solvents to prepare silicone hydrogel contact lenses.

SUMMARY

Described herein are methods for producing silicone hydrogel lenses. The methods involve introducing into a mold a water-based lens-forming composition, curing the lens-forming composition in a mold to form the lens, and removing the lens from the mold. The water-based lens-forming composition comprises (i) a polysiloxane-containing vinylic macromer, (ii) optionally a hydrophilic vinylic monomer, (iii) a polysiloxane-containing surfactant, and (iv) water. The polysiloxane-containing surfactant is liquid at room temperature, is free of actinically-polymerizable groups (i.e., it is not-actinically-polymerizable), and is a copolymer including from about 10% to about 40% by weight of one or more polysiloxane segments and from about 60% to about 90% by weight hydrophilic units and/or segments. The polysiloxane-containing surfactant is present in the lens-forming composition in an amount sufficient to dissolve the polysiloxane-containing vinylic monomer or macromer in water to form a substantially clear solution. The methods permit the use of water as a solvent and reduce the need for organic solvents. The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Before the ophthalmic lenses and methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a monomer" includes mixtures of two or more such monomers, and the like.

"Optional" or "optionally" means that the subsequently described event or circumstance can or cannot occur, and that the description includes instances where the event or circumstance occurs and instances where it does not. For example, the phrase "optional tinting agent" means that the tinting agent can or cannot be present.

Unless defined otherwise, all technical and scientific terms used herein have the same meaning as commonly understood by one of ordinary skill in the art to which this invention belongs. As employed throughout the disclosure, the following terms, unless otherwise indicated, shall be understood to have the following meanings.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "amino" as used herein has the formula —NRR', where R and R' are, independently, hydrogen, an alkyl group, or an aryl group.

The term "alkylene" as used herein refers to a divalent radical of hydrocarbon.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus. The cycloalkyl group can be substituted or unsubstituted. The cycloalkyl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aryl" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "poly(alkylene oxide) chain" as used herein is a divalent radical having the formula —$(R^aO)_n$—$(R^bO)_m$—$(R^cO)_l$—, where $R^a$, $R^b$, and $R^c$ are, independently, ethylene (—$CH_2CH_2$—) or propylene (—$CH(CH_3)$—$CH_2$—) divalent radical, and n, m, and l are, independently, from 0 to 100, provided that the sum of n, m and l is from 3 to 100, and at least one of $R^a$, $R^b$, and $R^c$ is an ethylene divalent radical.

The term "alkylene amine" as used herein is a group composed of one or more repeat units having the formula —$(R^a)_n NR$—, where $R^a$ is a linear or branched $C_1$-$C_4$-alkylene, n is from 1 to 10, and R is hydrogen, an alkyl group, or an aryl group.

The term "carbonyl" as used herein is a group or molecule composed of a C=O group. The carbonyl group can be present as an aldehyde, ketone, ester, anhydride, or carboxylic acid group.

The term "dicarbonyl" as used herein is a group or molecule composed of two C=O groups. Each carbonyl group, independently, can be present as an aldehyde, ketone, ester, anhydride, or carboxylic acid group.

A "polysiloxane-containing vinylic monomer or macromer" refers to a vinylic monomer or macromer containing at least one ethylenically unsaturated group and at least one polysiloxane unit or segment.

The term "polysiloxane unit or segment" as used herein is a di- or multivalent radical of formula (1)

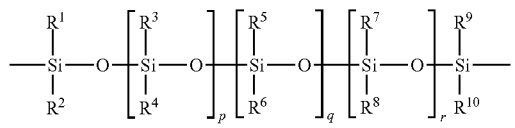

(1)

wherein $R^1$ to $R^{10}$ are, independently, $C_1$-$C_8$-alkyl, $C_1$-$C_4$ alkyl- or $C_1$-$C_4$-alkoxy-substituted phenyl, fluoro($C_1$-$C_{18}$-alkyl), cyano($C_1$-$C_{12}$-alkyl), or -alk-, wherein alk is $C_1$-$C_6$-alkylene divalent radical, p, q and r are, independently, an integer from 0 to 700, and (p+q+r) is from 5 to 700.

A "hydrogel" refers to a polymeric material that can absorb at least 10 percent by weight of water when it is fully hydrated. A hydrogel material can be obtained by polymerization or copolymerization of at least one hydrophilic monomer in the presence of or in the absence of additional monomers and/or macromers or by crosslinking of a prepolymer in the presence or absence of other polymerizable components (e.g., vinylic monomer(s), vinylic macromer(s), and/or crosslinking agents).

A "silicone hydrogel" refers to a hydrogel obtained by copolymerization of a polymerizable composition comprising at least one silicone-containing vinylic monomer or at least one silicone-containing macromer or at least one silicone-containing prepolymer.

"Hydrophilic," as used herein, describes a material or portion thereof that will more readily associate with water than with lipids.

The term "water-based" in reference to a lens-forming composition means that the solvent used in the preparation of the lens-forming composition is water or a mixture of water and one or more organic solvents miscible with water, wherein the solvent mixture comprises at least about 70%, preferably at least about 80%, more preferably at least about 90%, most preferably at least about 98% by volume of water.

The term "fluid" as used herein indicates that a material is capable of flowing like a liquid.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g., gamma ray or X-ray irradiation), microwave irradiation, and the like. Thermal curing or actinic curing methods are well-known to a person skilled in the art.

A "vinylic monomer" or "monomer," as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylenically unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

A "hydrophilic vinylic monomer," as used herein, refers to a vinylic monomer that is capable of forming a homopolymer that is water soluble or can absorb at least 10 percent by weight water when fully hydrated.

A "macromer" or "vinylic macromer" refers to a medium to high molecular weight compound or polymer that contains ethylenically unsaturated groups capable of undergoing free radical polymerization reactions. Medium and high molecular weight typically means average molecular weights greater than 700 Daltons.

A "prepolymer" refers to a starting polymer that has two or more ethylenically unsaturated groups and can be cured (e.g., crosslinked and/or polymerized) actinically or thermally (according to free radical polymerization mechanism) to obtain a crosslinked and/or polymerized polymer having a molecular weight much higher than the starting polymer.

"Molecular weight" of a polymeric material (including monomeric or macromeric materials), as used herein, refers to the weight-average molecular weight unless otherwise specifically noted or unless testing conditions indicate otherwise.

A "photoinitiator" refers to a chemical that initiates radical crosslinking and/or polymerizing reaction by the use of light. Suitable photoinitiators include, without limitation, benzoin methyl ether, diethoxyacetophenone, a benzoyl phosphine oxide, 1-hydroxycyclohexyl phenyl ketone, DAROCURE® types, and IRGACURE® types such as DAROCURE® 1173, and IRGACURE® 2959.

"Thermal initiator" refers to a chemical that initiates radical crosslinking and/or polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. In some aspects, the thermal initiator is azobisisobutyronitrile (AIBN).

"Tinting agent," as used herein includes, but is not limited to, a dye or a pigment that can be incorporated into the lens or lens-forming material.

An "antimicrobial agent" refers to a chemical that is capable of decreasing or eliminating or inhibiting the growth of microorganisms such as that term is known in the art.

"Contact lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. Typically a contact lens has an anterior surface and an opposite posterior surface and a circumferential edge where the anterior and posterior surfaces are tapered off.

The intrinsic "oxygen permeability" (Dk) of a material is the rate at which oxygen will pass through a material. In accordance with the invention, the term "oxygen permeability (Dk)" in reference to a material or a contact lens means an apparent oxygen permeability which is measured with a sample (film or lens) of 90 or 100 microns in average thickness over the area being measured according to a coulometric method as illustrated in Example 1. Oxygen permeability is conventionally expressed in units of barrers, where "barrer" is defined as [(cm$^3$ oxygen)(mm)/(cm$^2$)(sec)(mm Hg)]×10$^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as [(cm$^3$ oxygen)/(cm$^2$)(sec)(mm Hg)]×10$^{-9}$.

Described herein are methods for making a silicone hydrogel lens. In one aspect, the method comprises:
a. introducing into a mold a water-based lens-forming composition comprising (i) a polysiloxane-containing vinylic monomer or macromer; (ii) optionally a hydrophilic vinylic monomer; (iii) a polysiloxane-containing surfactant, and (iv) water, wherein the polysiloxane-containing surfactant is liquid at room temperature, free of actinically-polymerizable groups, and a copolymer including from about 10% to about 40% by weight of one or more polysiloxane segments and from about 90% to about 60% by weight hydrophilic units and/or segments, wherein the polysiloxane-containing surfactant is present in an amount sufficient to dissolve the polysiloxane-containing vinylic monomer or macromer in water to form a substantially clear solution;
b. curing the composition to produce the lens; and
c. removing the lens from the mold.

A "polysiloxane-containing vinylic monomer or macromer" refers to a compound containing at least one ethylenically unsaturated group and a polysiloxane segment of formula (1) described above. Examples of such compounds are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); dimethacrylated or diacrylated polydimethylsiloxanes of various molecular weight; vinyl carbonate-terminated polydimethylsiloxanes; vinyl carbamate-terminated polydimethylsiloxane; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane; polysiloxanylalkyl (meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing vinylic monomers or macromers; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing macromers disclosed in U.S. Pat. Nos. 4,259,467, 4,260,725, and 4,261,875 (herein incorporated by reference in their entireties). Di and triblock macromers consisting of polydimethylsiloxane and polyalkyleneoxides could also be of utility. For example one might use methacrylate end capped polyethyleneoxide-block-polydimethylsiloxane-block-polyethyleneoxide to enhance oxygen permeability. Suitable monofunctional hydroxyl-functionalized siloxane-containing vinylic monomers/macromers and suitable multi-functional hydroxyl-functionalized siloxane-containing vinylic monomers/macromers are commercially available from Gelest, Inc, Morrisville, Pa.

Another class of preferred polysiloxane-containing macromers are silicone-containing prepolymers comprising hydrophilic segments and hydrohpbobic segments. Any suitable silicone-containing prepolymers with hydrophilic segments and hydrohphobic segments can be used in the invention. Examples of such silicone-containing prepolymers include those described in commonly-owned U.S. Pat. Nos. 6,039,913, 7,091,283, 7,268,189 and 7,238,750, 7,521,519; commonly-owned US patent application publication Nos. US 2008-0015315 A1, US 2008-0143958 A1, US 2008-0143003 A1, US 2008-0234457 A1, US 2008-0231798 A1, and commonly-owned U.S. patent application Nos. 61/180,449 and 61/180,453; all of which are incorporated herein by references in their entireties.

One or more hydrophilic vinylic monomers are used to in the methods described herein to produce the silicone hydrogel lenses. Any suitable hydrophilic vinylic monomers can be used herein. Examples of hydrophilic vinylic monomers include without limitation hydroxyl-substituted lower alkyl ($C_1$ to $C_3$) (meth)acrylates, hydroxyl-substituted lower alkyl vinyl ethers, $C_1$ to $C_3$ alkyl(meth)acrylamide, di-($C_1$-$C_3$ alkyl)(meth)acrylamide, N-vinylpyrrole, N-vinyl-2-pyrrolidone, 2-vinyloxazoline, 2-vinyl-4,4'-dialkyloxazolin-5-one, 2- and 4-vinylpyridine, amino(lower alkyl)- (where the term "amino" also includes quaternary ammonium), mono(lower alkylamino)(lower alkyl) and di(lower alkylamino)(lower alkyl)(meth)acrylates, allyl alcohol, N-vinyl $C_1$ to $C_3$ alkylamide, N-vinyl-N—$C_1$ to $C_3$ alkylamide, $C_1$-$C_4$-alkoxy polyethylene glycol (meth)acrylate having a weight average molecular weight of up to 1500, and the like.

Examples of preferred hydrophilic vinylic monomers are N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, a $C_1$-$C_4$-alkoxy polyethylene glycol (meth)acrylate having a weight average molecular weight of up to 1500, N-vinyl formamide, N-vinyl acetamide, N-vinyl isopropylamide, N-vinyl-N-methyl acetamide, allyl alcohol, N-vinyl caprolactam, and mixtures thereof.

Silicone-containing vinylic monomers can also be used herein to produce the silicone hydrogel lenses. Examples of preferred silicone-containing vinylic monomers include without limitation N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl](meth)acrylamide, N-[tris(dimethylethylsiloxy)silylpropyl](meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl)acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl]acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy)methylsilane, N-2-methacryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]-propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate; trimethylsilylethyl vinyl carbonate, and trimethylsilylmethyl vinyl carbonate). Most preferred siloxane-containing (meth)acrylamide monomers of formula (1) are N-[tris(trimethylsiloxy)silylpropyl]acrylamide, TRIS, N-[2-hydroxy-3-(3-(t-butyldimethylsilyl)propyloxy)propyl]acrylamide.

The water-based lens-forming composition can also include one or more hydrophobic monomers. By incorporating a certain amount of hydrophobic vinylic monomer in a lens-forming material, the mechanical properties (e.g., modulus of elasticity) of the resultant polymer may be improved. Nearly any hydrophobic vinylic monomer can be used. Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

Turning to the polysiloxane-containing surfactant, the surfactant is free of actinically-polymerizable groups and is a copolymer including from about 10% to about 40% by weight of one or more polysiloxane segments and from about 90% to about 60% by weight hydrophilic units and/or segments. It should be understood that the polysiloxane-containing surfactant may also contain hydrophobic units and/or segments which are not polysiloxane segments and make up the remaining weight percentage of the surfactant.

In accordance with the invention, the content of one or more polysiloxane segments in a polysiloxane-containing surfactant is determined to be the ratio of the weight percentage of all of the polysiloxane segments of formula (1) over the total weight of the polysiloxane-containing surfactant. The content of hydrophilic units and/or segments in the polysiloxane-containing surfactant is the ratio of the total weight of all of the hydrophilic units and/or segments over the total weight of the polysiloxane-containing surfactant.

The term "hydrophilic units" used throughout this application refers to: (1) hydrophilic groups selected from the group consisting of hydroxyl groups, carboxylic groups, amino groups (e.g., $-NH_2$, $-NHR$ or $-NRR'$ in which R and R' independently of each other are methyl or ethyl), urethane linkages ($-NH-CO-O-$), urea linkages ($-NH-CO-NH-$), and amide linkages ($-CO-NH-$ or $-CO-NR-$); (2) polymeric units that are obtained from a hydrophilic vinylic monomer or a hydrophilic crosslinker (i.e., a compound having two or more ethylenically-unsaturated groups and having a molecular weight of 700 Daltons or less) in a free-radical copolymerization reaction involving ethylenically unsaturated groups and becomes a structural part of a polymer; (3) poly(alkylene oxide) chains of formula $-(R^aO)_n-(R^bO)_m-(R^cO)_l-$, where $R^a$, $R^b$, and $R^c$ independent of one other are ethylene ($-CH_2CH_2-$) or propylene ($-CH(CH_3)-CH_2-$) divalent radical and n, m, and 1 independent of one other is from 0 to 100, provided that the sum of n, m and 1 is from 3 to 100 and at least one of $R^a$, $R^b$, and $R^c$ is ethylene divalent radical; or (4) combinations thereof.

The room temperature means a temperature of from about 20° C. to about 30° C.

Examples of hydrophilic vinylic monomers are described above. The water-based composition can also include one or more hydrophilic crosslinkers. Examples of hydrophilic crosslinkers include without limitation tetra(ethyleneglycol) diacrylate, tri(ethyleneglycol) diacrylate, ethyleneglycol diacylate, di(ethyleneglycol) diacrylate, tetraethyleneglycol dimethacrylate, triethyleneglycol dimethacrylate, ethyleneglycol dimethacylate, di(ethyleneglycol) dimethacrylate, ethylenediamine dimethyacrylamide, glycerol dimethacrylate, triallyl isocyanurate, triallyl cyanurate, di-acrylate-terminated polyethyleneglycol having a molecular weight of 700 Daltons or less, di-methacrylate-terminated polyethyleneglycol having a molecular weight of 700 Daltons or less, di-acrylamide-terminated polyethyleneglycol having a molecular weight of 700 Daltons or less, di-methacrylamide-terminated polyethyleneglycol having a molecular weight of 700 Daltons or less, di-vinyl-terminated polyethyleneglycol having a molecular weight of 700 Daltons or less, and combinations thereof.

The surfactant does not contain any actinically-polymerizable groups. Therefore, upon curing the lens-forming materials, the surfactant is not polymerized with these components. Not wishing to be bound by theory, after photocuring and formation of the contact lens, the surfactant over time can be slowly released from the fabricated lens while packaged in the storing solution. Additionally, the surfactant can be released from the contact lens when in use by the subject and perform as a comfort agent.

The synthesis of the surfactant can be achieved using various standard organic techniques known to a person skilled in the art. For example, a surfactant of the invention can be obtained according to similar procedures described in US patent application publication No. US 2008-0234457 A1 (herein incorporated by reference in its entirety). A surfactant can obtained by copolymerization of a mixture comprising (a) from about 10% to about 40% by weight of at least one linear polysiloxane-containing compound terminated with two first or second functional groups (i.e., having two functional groups one at each of two opposite ends), (b) from about 90% to about 60% by weight of (i) at least one linear hydrophilic monomer or polymer with two terminal first or second functional groups and (ii) at least one hydrophilic polymer with only one first or second functional group, and (c) one or more branching agents which independently of each other are an organic compound with three or more first or second functional groups, wherein the first and second functional groups are different from each other and selected from the group consisting of amine group, hydroxyl, carboxy, isocyanate, epoxy, and acid halide group, wherein the first and second functional groups are different from each other but coreactive with each other in the presence or absence of a coupling agent to form a covalent linkage selected from the group consisting of urethane, urea, ether, and amide, wherein the ratio of molar equivalents of the first functional groups to the second functional groups or of the second function groups to the first functional groups in the mixture is from about 1.1 to about 20, preferably from about 1.1 to about 5, more preferably from about 1.1 to about 3.

Where the first functional groups are amine groups and the second functional groups are isocyanate group, the obtained intermediary copolymers are amine-capped polyureas.

Where the first functional groups are isocyanate groups and the second functional groups are amine group, the obtained intermediary copolymers are isocyanate-capped polyureas.

Where the first functional groups are hydroxy groups and the second functional groups are isocyanate group, the obtained intermediary copolymers are hydroxy-capped polyurethanes.

Where the first functional groups are isocyanate groups and the second functional groups are hydroxy group, the obtained intermediary copolymers are isocyanate-capped polyurethanes.

Where the first functional groups are amine groups and the second functional groups are acid halide group, the obtained intermediary copolymers are amine-capped polyamides.

Where the first functional groups are amine groups and the second functional groups are carboxyl groups, the intermediary copolymers obtained in the presence of EDC are amine-capped polyamides.

Where the first functional groups are carboxyl groups and the second functional groups are amine groups, the intermediary copolymers obtained in the presence of EDC are carboxyl-capped polyamides.

Where the first functional groups are hydroxy groups and the second functional groups are epoxy group, the obtained intermediary copolymers are hydroxy-capped polyethers.

Exemplary linear polysiloxane-containing compounds with two terminal functional groups selected from the group consisting of amino groups, hydroxyl groups, acid chloride groups, and epoxy groups are difunctional group-terminated polysiloxane, such as, for example, poly(dialkylsiloxane), poly(diarylsiloxane), polyarylalkylsiloxane, copolymers of different dialkysiloxanes, copolymers of dialkylsiloxane with diarylsiloxane or arylalkylsiloxane, or the like. Preferably, the siloxane-containing compound is a difunctional group terminated polydimethylsiloxane. Various difunctional group terminated functional polysiloxanes can be obtained from commercial suppliers (e.g., from Gelest, Inc, or Fluorochem). Otherwise, one skilled in the art will know how to prepare such difunctional group-terminated polysiloxanes according to procedures known in the art and described in Journal of Polymer Science—Chemistry, 33, 1773 (1995) (herein incorporated by reference in its entirety).

Exemplary hydrophilic monomer or hydrophilic macromers, with two terminal functional groups selected from the consisting of amino groups, hydroxyl groups, acid chloride groups, and epoxy groups, are difunctional group-terminated poly(ethylene glycol) (PEG), difunctional group-terminated block copolymers of ethylene oxide and propylene oxide ((PEG/PPG block copolymers, e.g., poloxamers or poloxamine), difunctional group-terminated polymers polyalkylacrylamides, difunctional group-terminated polyalkylmethacrylamides, difunctional group-terminated polyvinylpyrrolidones, difunctional group-terminated copolymers of N-vinylpyrrolidone with one or more vinylic monomers (such as, e.g., dialkylaminoalkylacrylate, dialkylaminoalkylmethacrylate, N,N-dialkylacrylamide, N,N-dialkylmethacrylamide, vinylacetate, or mixture thereof), diamine- or dicarboxyl-terminated polyvinylalcohols (derived from methanolysis or hydrolysis of functional group terminated polyvinylacetates), and difunctional group-terminated copolymers (preferably subjected to methanolysis or hydrolysis) of vinylacetate with one or more vinylic monomers (e.g., dialkylaminoalkylacrylate, dialkylaminoalkylmethacrylate, N,N-dialkylacrylamide, N,N-dialkylmethacrylamide, or mixture thereof).

Various amine-terminated PEGs, hydroxyl-terminated PEGs, and epoxy-terminated PEGs can be obtained from commercial suppliers, such as, Polyscience, and Shearwater Polymers, inc., etc.

A polysiloxane-containing surfactant can also be prepared according to similar procedures described in US patent application publication No. 2008/0015315 A1 and U.S. Pat. No. 7,091,283 (herein incorporated by reference in their entireties). For example, a surfactant of the invention can be prepared by polymerizing a polymerizable composition comprising (1) from about 10% to about 40% by weight of one or more polysiloxane-containing macromers with one or two ethylenically unsaturated groups and (2) from about 90% to about 60% by weight of one or more hydrophilic vinylic monomer and/or hydrophilic prepolymers.

A surfactant of the invention can also prepared according to similar procedures described in U.S. patent application Ser. No. 12/616,166 (herein incorporated by reference in its entirety) for the preparation of a linear polysiloxane copolymer comprising at least one linear polysiloxane segment end-capped at least one of the two ends of the polysiloxane segment with a hydrophilic polymer chain through a linkage. A preferred linear polysiloxane copolymer is defined by formula (2):

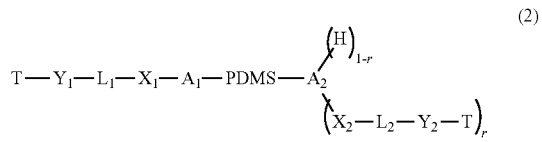

wherein r is an integer of 0 or 1;

$A_1$ and $A_2$ are, independently, a linear or branched $C_1$-$C_{10}$ alkylene divalent radical;

$X_1$ and $X_2$ are, independently, a linkage selected from the group consisting of a direct bond,

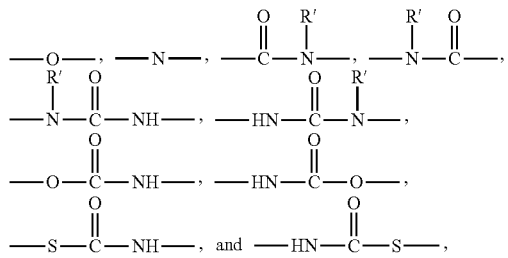

in which R' in H or $C_1$-$C_8$ alkyl;

$L_1$ and $L_2$ independent of each other are

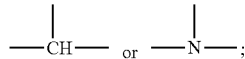

PDMS is a polysiloxane divalent radical of formula (3)

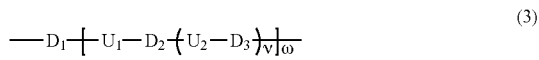

wherein v is 0 or 1, ω is an integer of from 0 to 5, $U_1$ and $U_2$ are, independently, a divalent radical of —$R^{11}$—$X^3$-E-$X^4$—$R'^{11}$— wherein $R^{11}$ and $R'^{11}$ are, independently, a linear or branched $C_1$-$C_{10}$ alkylene divalent radical, $X^3$ and $X^4$ independent of each other are a linkage selected from the group consisting of

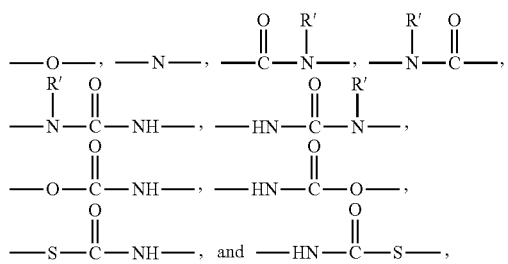

in which R' is H or $C_1$-$C_8$ alkyl, E is an alkyl diradical, a cycloalkyl diradical, an alkylcycloalkyl diradical, an alkylaryl diradical, or an aryl diradical with 1 to 40 carbon atoms that optionally have an ether, thio, or amine linkage in the main chain, $D_1$, $D_2$ and $D_3$ independently of each other represent a divalent group of formula (1):

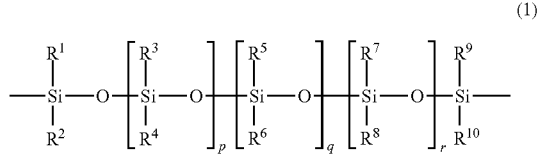

wherein $R^1$ to $R^{10}$ are, independently, $C_1$-$C_8$-alkyl, $C_1$-$C_4$ alkyl- or $C_1$-$C_4$— alkoxy-substituted phenyl, fluoro($C_1$-$C_{18}$-alkyl), cyano($C_1$-$C_{12}$-alkyl), or -alk-, wherein alk is $C_1$-$C_6$-alkylene divalent radical, p, q and r are, independently, an integer from 0 to 700, and (p+q+r) is from 5 to 700;

$Y^1$ and $Y^2$ are, independently, a divalent radical of formula (4) or (5)

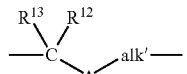

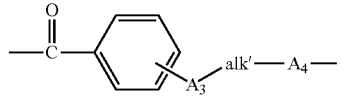

wherein
$R^{12}$ and $R^{13}$ independent of each other are hydrogen, $C_1$-$C_8$ alkyl, $C_1$-$C_8$ cycloalkyl, or $C_1$-$C_8$ aryl, or $R^{12}$ and $R^{13}$ together are —$(CH_2)_g$— where g is an integer from 2 to 6,
alk' is a linear or branched $C_1$-$C_{10}$ alkylene divalent radical,
A and $A_4$ are, independently, —O—, —NR'—, or —S—;
$A_3$ is a linkage selected from the group consisting of

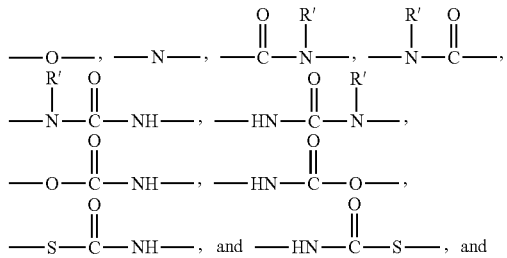

T is a monovalent hydrophilic polymer chain composed of monomer units from one or more hydrophilic vinylic monomers selected from the group of hydrophilic vinylic monomers described above, preferably selected from the group consisting of N-vinyl-2-pyrrolidone (NVP), N,N-dimethylacrylamide (DMA), dimethylaminoethyl methacrylate, dimethylaminoethyl acrylate, dimethylaminoethylmethacrylamide, a $C_1$-$C_4$-alkoxy polyethylene glycol (meth)acrylate having a weight average molecular weight of from 200 to 1500, N-vinyl-N-methyl isopropylamide, N-vinyl-N-methyl acetamide, and vinyl alcohol.

In one aspect, the surfactant is a copolymer of an atom-transfer radical polymerization (ATRP) product of a reactive mixture comprising from about 10% to about 40% by weight of one or more polysiloxane ATRP macroinitiators and from about 90% to about 60% by weight of at least one hydrophilic vinylic monomer produced by the similar procedures described in U.S. provisional patent application No. 61/180,453 (herein incorporated by reference in its entirety).

In another aspect, the surfactant is obtained according to similar procedures described in US patent application publication No. 2009/0143499 A1 (herein incorporated by reference in it entirety). For example, the surfactant can be produced by copolymerizing a mixture comprising (1) from about 90% to about 60% by weight of at least one poly(oxyalkylene) having at least two first reactive groups, (2) from about 10% to about 40% by weight of at least one polysiloxane having at least two second reactive groups, and (3) optionally a hetero difunctional compound having one ene-containing group and one first or second reactive group, wherein the first and second reactive groups, different from each other, are either thiol groups or acryl group and undergo Michael addition reaction to form carbon-sulfur bonds.

In one aspect, the water-based lens-forming composition comprises a polysiloxane-containing vinylic macromer and a polysiloxane-containing surfactant, wherein the polysiloxane-containing vinylic monomer or macromer comprises from about 50% to about 99% by weight of one or more polysiloxane segments and from 0 to about 40% by weight of hydrophilic units and/or segments, wherein the polysiloxane-containing surfactant comprises from about 10% to about 40% by weight of one or more polysiloxane segments and from about 90% to about 60% by weight of hydrophilic units and/or segments. It should be understood that the polysiloxane-containing vinylic monomer or macromer may contain hydrophobic units and/or segments which are not polysiloxane segments and make up the remaining weight percentage of the surfactant.

In another aspect, the surfactant and the polysiloxane-containing vinylic monomer or macromer have similar if not identical hydrophilic and hydrophobic segments (i.e., chemical groups). The following example demonstrates this with the silicone-containing vinylic macromer having the formula I:

$$\text{CP-PAO-ALK-PDMS-ALK-PAO-CP} \qquad (I)$$

where PDMS is a divalent poly(disubstituted siloxane), ALK is an alkylene or alkylenoxy group having at least 3 carbon atoms, DU is a diurethane-containing group, PAO is a divalent polyoxyalkylene of formula —$(R^aO)_n$—$(R^bO)_m$—$(R^cO)_l$— in which $R^a$, $R^b$, and $R^c$ independent of one other are ethylene (—CH$_2$CH$_2$—) or propylene (—CH(CH$_3$)—CH$_2$—) divalent radical and n, m, and l independent of one other is from 0 to 100, provided that the sum of n, m and l is from 3 to 100 and at least one of $R^a$, $R^b$, and $R^c$ is ethylene divalent radical; or (4) combinations thereof, and CP is an acrylate and methacrylate (Macromer A in U.S. Pat. No. 5,760,100). An example of a surfactant that is a conjugate of the macromer having the formula I is depicted in formula II

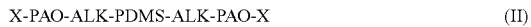
$$\text{X-PAO-ALK-PDMS-ALK-PAO-X} \qquad (II)$$

where X is a non-actinically polymerizable group. In this example, the hydrophilic and hydrophobic segments (i.e., PAO, ALK, PDMS) of the surfactant and the macromer are the same. However, it is not necessary that the hydrophilic and hydrophobic segments in the macromer and surfactant be identical. If the hydrophilic and hydrophobic segments present in the macromer and surfactant have similar hydrophilic and hydrophobic properties, respectively, then the segments do not need to be identical. The surfactant can be substituted with a variety of functional groups. For example, X in formula II above can be a hydroxyl group, an amino group, a thiol group, a carboxylic acid group, an ester, and the like.

Not wishing to be bound by theory, because of much higher weight percentage of hydrophilic units and/or segments than that of the polysiloxane segments in the surfactant, it is water soluble. Because of the amphiphilic nature (due to the presence of both polysiloxane segments and hydrophilic units/segments in the surfactant, the surfactant may interact with the polysiloxane-containing vinylic macromer in water. The interaction can be an ionic interaction, polar interaction, or a combination thereof. The interaction between the surfactant and macromer can prevent or minimize the formation of an emulsion when the macromer is formulated in water. Thus, the surfactant makes the macromer more soluble in water. In certain aspects, the macromer when used in combination with the surfactant can be completely dissolved in water to produce a homogenous solution in the absence of organic solvents. In one aspect, the silicone-containing vinylic macromer and the surfactant are admixed first in water prior to the addition of other lens-forming materials.

The amount of surfactant used in the methods described herein can vary depending upon the amount of macromer used. The polysiloxane-containing surfactant is present in the lens-forming composition in an amount sufficient to dissolve the polysiloxane-containing vinylic monomer or macromer in water to form a substantially clear solution. Here, the solution is either completely homogeneous or at most contains nominal amounts of particulate matter so that they are not visually detectable. Preferably, the solution in the absence of any pigment-tinting agent has an optical transmissibility of at least about 85%, more preferably at least about 90%, even more preferably at least about 95%, most preferably at least about 98%. In one aspect, the amount of surfactant is from about 1% to about 30% by weight of the lens-forming materials.

In addition to the components described above, the lens-forming composition may comprise crosslinker with a molecular weight of 700 Daltons or less to improve structural integrity and mechanical strength of the lens. Examples of crosslinkers include, but are not limited to, tetra(ethyleneglycol) diacrylate, tri(ethyleneglycol) diacrylate, ethyleneglycol diacylate, di(ethyleneglycol) diacrylate, tetraethyleneglycol dimethacrylate, triethyleneglycol dimethacrylate, ethyleneglycol dimethacylate, di(ethyleneglycol) dimethacrylate, trimethylopropane trimethacrylate, pentaerythritol tetramethacrylate, bisphenol A dimethacrylate, vinyl methacrylate, ethylenediamine dimethyacrylamide, glycerol dimethacrylate, triallyl isocyanurate, triallyl cyanurate, allylmethacrylate, and combinations thereof. A preferred cross-linking agent is tetra(ethyleneglycol) diacrylate, tri(ethyleneglycol) diacrylate, ethyleneglycol diacrylate, di(ethyleneglycol) diacrylate, triallyl isocyanurate, or triallyl cyanurate.

The lens-forming composition for making silicone hydrogel lenses can also comprise various components, such as, for example, polymerization initiators (e.g., photoinitiator or thermal initiator), a visibility tinting agent (e.g., dyes, pigments, or mixtures thereof), a polymerizable UV-absorbing agent, a polymerizable latent UV-absorbing agent, antimicrobial agents (e.g., preferably silver nanoparticles), bioactive agent, leachable lubricants, and the like, as known to a person skilled in the art.

Examples of suitable photoinitiators include, but are not limited to, benzoin methyl ether, diethoxyacetophenone, a benzoylphosphine oxide, 1-hydroxycyclohexylphenyl ketone, or Darocure® or Irgacure® types, for example Darocure® 1173 or Irgacure® 2959. Examples of benzoylphosphine initiators include 2,4,6-tri-methylbenzoyldiphenylophosphine oxide, bis-(2,6 dichlorobenzoyl)-4-N-propylphenylphosphine oxide; and bis-(2,6-dichlorobenzoyl)-4-N-butylphenylphosphine oxide. The amount of photoinitiator can be selected within wide limits, an amount of up to 0.05 g/g of prepolymer and preferably up to 0.003 g/g of prepolymer can be used. A person skilled in the art will know well how to select the appropriate photoinitiator. Examples of thermal initiators include, but are not limited to, 2,2'-azobis(2,4-dimethylpentanenitrile), 2,2'-azobis(2-methylpropanenitrile), 2,2'-azobis(2-methylbutanenitrile), azobisisobutyronitrile (AIBN), peroxides such as benzoyl peroxide, and the like.

In some aspects, the lens-forming composition can further include a UV-absorber, a tinting agent, an antimicrobial agent, an inhibitor, a filler or any combination thereof. In one aspect, the ultraviolet absorber can include, for example, a benzotriazole or a benzophenone. Many benzotriazole and benzophenone UV absorbers are known and many are commercially available. The identity of the benzotriazole or benzophenone UV absorber is not critical, but should be selected based on its characteristic UV cut-off to give the desired UV absorbing property.

In some aspects, the lens-forming composition as described above is poured into a mold with a specific shape and size. When the ocular device is a contact lens, the lens can be produced using techniques known in the art. For example, the contact lens can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810.

Lens molds for making contact lenses are well known in the art. For example, a mold (for full cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens-forming cavity is formed between the first molding surface and the second molding surface. The molding surface of a mold half is the cavity-forming surface of the mold and in direct contact with the lens-forming material.

Methods of manufacturing mold sections for cast-molding a contact lens are generally well known to those of ordinary skill in the art. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002, which are also incorporated herein by reference.

Virtually all materials known in the art for making molds can be used to make molds for preparing ocular lenses. For example, polymeric materials, such as polyethylene, polypropylene, polystyrene, PMMA, cyclic olefin copolymers (e.g., Topas® COC from Ticona GmbH of Frankfurt, Germany and Summit, N.J.; Zeonex® and Zeonor® from Zeon Chemicals LP, Louisville, Ky.), or the like can be used. Other materials that allow UV light transmission could be used, such as quartz glass and sapphire.

Once the lens-forming composition is poured into the mold, the mixture is cured (i.e., polymerized) to produce a polymeric matrix and ultimately the lens. The techniques for conducting the polymerization step will vary depending upon the selection of the lens-forming material. In one aspect, the mold containing the mixture can be exposed to a spatial limitation of actinic radiation to polymerize the macromer and other lens-forming materials. In other aspects, the mold containing the mixture can be subjected to heat in order to cure the macromer and additional lens-forming materials.

In other aspects, the energy used to cure the mixture is in the form of rays directed by, for example, a mask or screen or combinations thereof, to impinge, in a spatially restricted manner, onto an area having a well defined peripheral boundary. For example, a spatial limitation of UV radiation can be achieved by using a mask or screen that has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region. The energy used for the crosslinking is radiation energy, UV radiation, visible light, gamma radiation, electron radiation or thermal radiation, the radiation energy preferably being in the form of a substantially parallel beam in order on the one hand to achieve good restriction and on the other hand efficient use of the energy.

In one aspect, the mold containing the lens-forming composition is exposed to light having a wavelength greater than 300 nm, greater than 310 nm, greater than 320 nm, greater than 330 nm, greater than 340 nm, greater than 350 nm, greater than 360 nm, greater than 370 nm, or greater than 380 nm. Cut-off filters known in the art can be used to filter and prevent specific wavelengths of energy from contacting the mold and lens-forming material. The time the mixture is exposed to the energy is relatively short, e.g. in less than or equal to 150 minutes, in less than or equal to 90 minutes, in less than or equal 60 minutes, less than or equal to 20 minutes, less than or equal to 10 minutes, less than or equal to 5 minutes, from 1 to 60 seconds, or from 1 to 30 seconds.

The surface of the lenses produced herein can be treated or modified using techniques known in the art. "Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Patent Application No. 60/811,949 (herein incorporated by reference in its entirety), and LbL coating. A preferred class of surface treatment processes are plasma processes, in which an ionized gas is applied to the surface of an article. Plasma gases and processing conditions are described more fully in U.S. Pat. Nos. 4,312,575 and 4,632,844, which are incorporated herein by reference. The plasma gas is preferably a mixture of lower alkanes and nitrogen, oxygen or an inert gas.

The methods described herein can produce a variety of silicone hydrogel lenses including a contact lens or an intraocular lens.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example 1

Oxygen permeability measurements. The oxygen permeability of a lens and oxygen transmissibility of a lens material can be determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app}=Jt(P_{oxygen})$$

where J=oxygen flux [microliters O$_2$/cm$^2$-minute]
$P_{oxygen}=(P_{measured}-P_{water}$ vapor$)=$(% O$_2$ in air stream) [mm Hg]=partial pressure of oxygen in the air stream
$P_{measured}=$barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)
$Dk_{app}$ is expressed in units of barrers.

The oxygen transmissibility (Dk/t) of the material may be calculated by dividing the oxygen permeability ($Dk_{app}$) by the average thickness (t) of the lens.

Ion Permeability Measurements.

The ion permeability of a lens can be measured according to procedures described in U.S. Pat. No. 5,760,100 (herein incorporated by reference in its entirety). The values of ion permeability are relative ionoflux diffusion coefficients ($D/D_{ref}$) in reference to a lens material, Alsacon, as reference material. Alsacon has an ionoflux diffusion coefficient of 0.314×10$^{-3}$ mm$^2$/minute.

Example 2

This example illustrates the preparation of a water-based solution of polysiloxane copolymers. One polysiloxane block copolymer, GP-690 (HO-PEG-PDMS-PEG-OH, Mw=3172), has about 63% by weight of polysiloxane segment and about 37% by weight of hydrophilic polymeric segment (polyethyleneglycol, PEG). GP-690 is used in this example as a substitute for a polysiloxane vinylic macromer. The other polysiloxane block copolymer, DBE-C25 (HO-PEG-PDMS-PEG-OH, Mw=3600-4400), has about 40% by weight of polysiloxane segment and about 60% by weight of hydrophilic polymeric segment (PEG). DEB-C25 is used in this example as a polysiloxane-containing surfactant.

When about 5.2 g of GP-690 (the "macromer") is mixed with about 5 g of water, it is found that GP-690 is insoluble in water and an opaque mixture is obtained.

When about 5.2 g of DBE (the "surfactant") is mixed with about 5 g of water, it is found that DBE is soluble in water and a clear (transparent) solution is obtained.

When about 2.6 g of GP-690 and 2.6 g of DBE-C25 is mixed and homogenized to obtain a liquid which is in turn mixed with about 5 g of water, a clear (transparent) solution is obtained.

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed:

1. A method for making a silicone hydrogel contact lens, wherein the method comprises:
    a. introducing into a mold a water-based lens-forming composition comprising
        (i) a polysiloxane-containing vinylic monomer or macromer,
        (ii) a hydrophilic vinylic monomer,
        (iii) a polysiloxane-containing surfactant which is liquid at room temperature and free of actinically-polymerizable groups, wherein the polysiloxane-containing surfactant is a copolymer comprising from about 10% to about 40% by weight of one or more polysiloxane segments and from about 90% to about 60% by weight of hydrophilic units and/or segments, wherein the polysiloxane-containing surfactant is present in an amount sufficient to dissolve the polysiloxane-containing vinylic monomer or macromer in water to form a substantially clear solution, and
        (iv) a solvent at least about 70% by volume of which is water;
    b. curing the composition to produce the lens; and
    c. removing the lens from the mold.

2. The method of claim 1, wherein the water-based lens-forming composition comprises a polysiloxane-containing vinylic macromer comprising from about 50% to about 99% by weight of one or more polysiloxane segments.

3. The method of claim 2, wherein the polysiloxane-containing vinylic monomer or macromer comprises a monomethacrylated or monoacrylated polydimethylsiloxane; a dimethacrylated or diacrylated polydimethylsiloxane; a vinyl carbonate-terminated polydimethylsiloxane; a vinyl carbamate-terminated polydimethylsiloxane; a vinyl terminated polydimethylsiloxane; a methacrylamide-terminated polydimethylsiloxane; an acrylamide-terminated polydimethylsiloxane; an acrylate-terminated polydimethylsiloxane; a methacrylate-terminated polydimethylsiloxane; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane; a polysiloxanylalkyl (meth)acrylic monomer, or any combination thereof.

4. The method of claim 2, wherein the polysiloxane-containing vinylic macromer comprises a silicone-containing prepolymer.

5. The method of claim 2, wherein the water-based lens-forming composition comprises at least one hydrophilic vinylic monomer which is N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethyl methacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, N-vinyl formamide, N-vinyl acetamide, N-vinyl isopropylamide, N-vinyl-N-methyl acetamide, allyl alcohol, N-vinyl caprolactam, or any combination thereof.

6. The method of claim 1, wherein the surfactant is obtained by copolymerization of a mixture comprising (a) from about 10% to about 40% by weight of at least one linear polysiloxane-containing compound terminated with two first or second functional groups, (b) from about 90% to about 60% by weight of (i) at least one linear hydrophilic compound or polymer with two terminal first or second functional groups and (ii) at least one hydrophilic polymer with only one first or second functional group, and (c) one or more branching agents which independently of each other are an organic compound with three or more first or second functional groups, wherein the first and second functional groups are different from each other and selected from the group consisting of amine group, hydroxyl, carboxy, isocyanate, epoxy, and acid halide group, and wherein the first and second functional groups are coreactive with each other in the presence or absence of a coupling agent to form a covalent linkage.

7. The method of claim 1, wherein the surfactant is obtained by copolymerization of a mixture comprising (1) from about 10% to about 40% by weight of one or more polysiloxane-containing macromers with one or two ethylenically unsaturated groups and (2) from about 90% to about 60% by weight of one or more hydrophilic vinylic monomers and/or hydrophilic prepolymers.

8. The method of claim 1, wherein the surfactant comprises at least one linear polysiloxane polymer end-capped at at least one of the two ends of the polysiloxane segment with a hydrophilic polymer chain through a linkage.

9. The method of claim 1, wherein the surfactant is defined by formula (2):

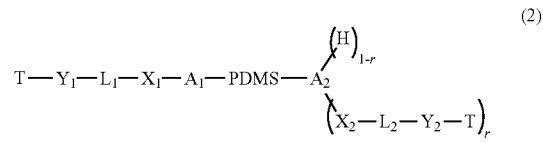

wherein r is an integer of 0 or 1;

$A_1$ and $A_2$ are, independently, a linear or branched $C_1$-$C_{10}$ alkylene divalent radical;

$X_1$ and $X_2$ are, independently a linkage selected from the group consisting of a direct bond,

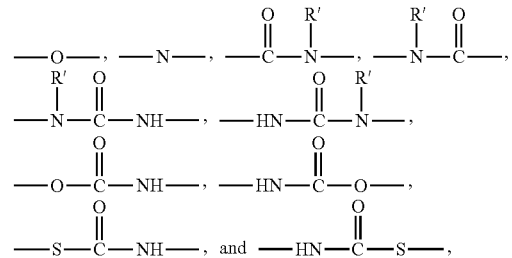

wherein R' is H or $C_1$-$C_8$ alkyl;

$L_1$ and $L_2$ are, independently,

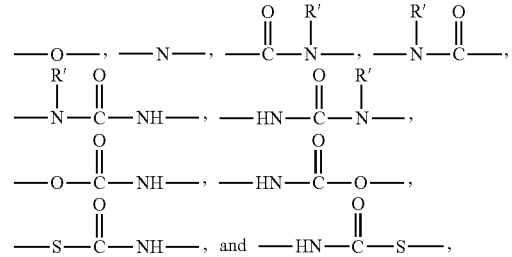

PDMS is a polysiloxane divalent radical of formula (3)

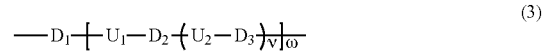

wherein v is 0 or 1, ω is an integer of from 0 to 5;

$U_1$ and $U_2$ are, independently, a divalent radical of —$R^{11}$—$X^3$-E-$X^4$—$R'^{11}$— wherein $R^{11}$ and $R'^{11}$ are, independently, a linear or branched $C_1$-$C_{10}$ alkylene divalent radical, $X^3$ and $X^4$ independent of each other are a linkage selected from the group consisting of

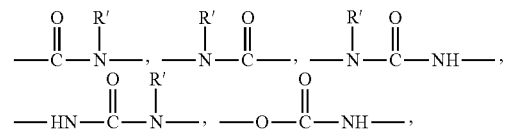

-continued

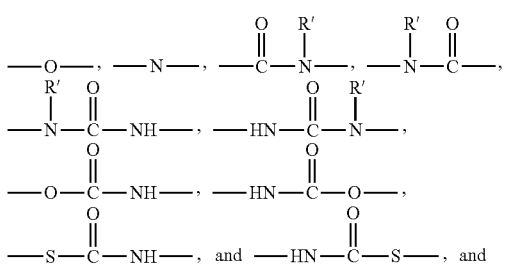

wherein R' is H or $C_1$-$C_8$ alkyl, E is an alkyl diradical, a cycloalkyl diradical, an alkylcycloalkyl diradical, an alkylaryl diradical, or an aryl diradical with 1 to 40 carbon atoms and optionally have an ether, thio, or amine linkage in the main chain;

$D_1$, $D_2$ and $D_3$ are, independently, a divalent group of formula (1):

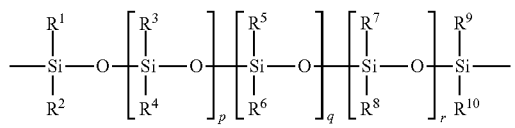

(1)

wherein $R^1$ to $R^{10}$ are, independently, $C_1$-$C_8$-alkyl, $C_1$-$C_4$ alkyl- or $C_1$-$C_4$-alkoxy-substituted phenyl, fluoro($C_1$-$C_{18}$-alkyl), cyano($C_1$-$C_{12}$-alkyl), or -alk-, wherein alk is $C_1$-$C_6$-alkylene divalent radical, p, q and r are, independently, an integer from 0 to 700, and (p+q+r) is from 5 to 700;

$Y^1$ and $Y^2$ are, independently, a divalent radical of formula (4) or (5)

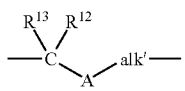

(4)

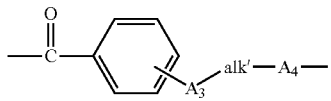

(5)

wherein $R^{12}$ and $R^{13}$ are, independently, hydrogen, $C_1$-$C_8$ alkyl, $C_1$-$C_8$ cycloalkyl, or $C_1$-$C_8$ aryl, or $R^{12}$ and $R^{13}$ together are —$(CH_2)_g$— where g is an integer from 2 to 6, alk' is a linear or branched $C_1$-$C_{10}$ alkylene divalent radical, A and $A_4$ are, independently, —O—, —NR'—, or —S—;
$A_3$ is a linkage selected from the group consisting of

  

T is a monovalent hydrophilic polymer chain comprising monomer units from one or more hydrophilic vinylic monomers.

10. The method of claim 1, wherein the water-based lens-forming composition comprises a polysiloxane-containing vinylic macromer has the formula I and a polysiloxane-containing surfactant has the formula II:

CP-PAO-ALK-PDMS-ALK-PAO-CP    (I)

X-PAO-ALK-PDMS-ALK-PAO-X    (II)

where PDMS is a divalent poly(disubstituted siloxane), ALK is an alkylene or alkylenoxy group having at least 3 carbon atoms, DU is a diurethane-containing group, PAO is a divalent polyoxyalkylene of formula —$(R^aO)_n$—$(R^bO)_m$—$(R^cO)_l$— in which $R^a$, $R^b$, and $R^c$ independent of one other are ethylene (—$CH_2CH_2$—) or propylene (—$CH(CH_3)$—$CH_2$—) divalent radical and n, m, and l independent of one other is from 0 to 100, provided that the sum of n, m and l is from 3 to 100 and at least one of $R^a$, $R^b$, and $R^c$ is ethylene divalent radical, CP is an acrylate and methacrylate, and X is a non-actinically-polymerizable group.

11. The method of claim 1, wherein the lens-forming composition further comprises a hydrophobic monomer.

12. The method of claim 11, wherein the hydrophobic monomer comprises methylacrylate, ethyl-acrylate, propylacrylate, isopropylacrylate, cyclohexylacrylate, 2-ethylhexylacrylate, methylmethacrylate, ethyl methacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate, or any combination thereof.

13. The method of claim 11, wherein the lens-forming composition further comprises a silicone-containing vinylic monomer selected from the group consisting of N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl](meth)acrylamide, N-[tris(dimethylethylsiloxy)silylpropyl](meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl) propyloxy)propyl]-2-methyl acrylamide; N,N-bis[2-hydroxy-3-(3-(bis(trimethylsilyloxy)methylsilyl)propyloxy)propyl]acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy) methylsilane, N-2-methacryloxyethyl-O-(methyl-bis-trimethylsiloxy-3-propyl)silylcarbamate, 3-(trimethylsilyl) propylvinyl carbonate, 3-(vinyloxycarbonylthio)propyl-tris (trimethyl-siloxy)silane, 3-[tris(trimethylsiloxy)silyl] propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate; trimethylsilylethyl vinyl carbonate, trimethylsilylmethyl vinyl carbonate), and combinations thereof.

14. The method of claim 11, wherein the lens-forming composition further comprises a crosslinker selected from the group consisting of tetraethyleneglycol diacrylate, triethyleneglycol diacrylate, ethyleneglycol diacylate, diethyleneglycol diacrylate, tetraethyleneglycol dimethacrylate, triethyleneglycol dimethacrylate, ethyleneglycol dimethacylate, diethyleneglycol dimethacrylate, trimethylopropane trimethacrylate, pentaerythritol tetramethacrylate, bisphenol A dimethacrylate, vinyl methacrylate, ethylenediamine dimethyacrylamide, ethylenediamine diacrylamide, glycerol dimethacrylate, triallyl isocyanurate, triallyl cyanurate, allylmethacrylate, allylmethacrylate, 1,3-bis(methacrylamidopropyl)-1,1,3,3-tetrakis(trimethylsiloxy)disiloxane, N,N'-methylenebisacrylamide, N,N'-methylenebismethacrylamide, N,N'-ethylenebisacrylamide, N,N'-ethylenebismethacrylamide, 1,3-bis(N-methacrylamidopropyl)-1,1,3,3-tetrakis-(trimethylsiloxy)disiloxane, 1,3-bis(methacrylamidobutyl)-1,1,3,3-tetrakis(trimethylsiloxy)-disiloxane, 1,3-bis(acrylamidopropyl)-1,1,3,3-tetrakis (trimethylsiloxy)disiloxane, 1,3-bis (methacryloxyethylureidopropyl)-1,1,3,3-tetrakis (trimethylsiloxy)disiloxane, and combinations thereof. A preferred cross-linking agent is tetra(ethyleneglycol) diacrylate, tri(ethyleneglycol) diacrylate, ethyleneglycol diacrylate, di(ethyleneglycol) diacrylate, methylenebisacrylamide, triallyl isocyanurate, triallyl cyanurate, and combinations thereof.

15. The method of claim 14, wherein the lens-forming composition further comprises a UV-absorber, a tinting agent, an antimicrobial agent, an inhibitor, a filler, or any combination thereof.

16. The method of claim 15, wherein the lens-forming composition comprises N,N-dimethylacrylamide and a dimethacrylated or diacrylated polydimethylsiloxane, wherein the polysiloxane-containing surfactant is obtained by copolymerization of a mixture comprising (a) from about 10% to about 40% by weight of at least one linear polysiloxane-containing compound terminated with two first or second functional groups, (b) from about 90% to about 60% by weight of (i) at least one linear hydrophilic compound or polymer with two terminal first or second functional groups and (ii) at least one hydrophilic polymer with only one first or second functional group, and (c) one or more branching agents which independently of each other are an organic compound with three or more first or second functional groups, wherein the first functional groups are hydroxyl groups and the second functional group are isocyanate groups.

17. The method of claim 5, wherein the surfactant is obtained by:
(A) copolymerization of a mixture comprising (a) from about 10% to about 40% by weight of at least one linear polysiloxane-containing compound terminated with two first or second functional groups, (b) from about 90% to about 60% by weight of (i) at least one linear hydrophilic compound or polymer with two terminal first or second functional groups and (ii) at least one hydrophilic polymer with only one first or second functional group, and (c) one or more branching agents which independently of each other are an organic compound with three or more first or second functional groups, wherein the first and second functional groups are different from each other and selected from the group consisting of amine group, hydroxyl, carboxy, isocyanate, epoxy, and acid halide group, and wherein the first and second functional groups are coreactive with each other in the presence or absence of a coupling agent to form a covalent linkage; or
(B) by copolymerization of a mixture comprising (1) from about 10% to about 40% by weight of one or more polysiloxane-containing macromers with one or two ethylenically unsaturated groups and (2) from about 90% to about 60% by weight of one or more hydrophilic vinylic monomers and/or hydrophilic prepolymers.

18. The method of claim 5, wherein the surfactant comprises at least one linear polysiloxane polymer end-capped at at least one of the two ends of the polysiloxane segment with a hydrophilic polymer chain through a linkage.

19. The method of claim 5, wherein the surfactant is defined by formula (2):

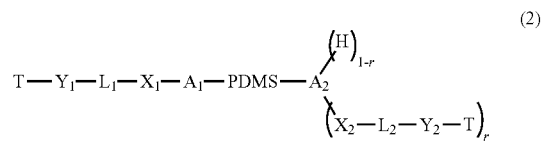

wherein r is an integer of 0 or 1;
$A_1$ and $A_2$ are, independently, a linear or branched $C_1$-$C_{10}$ alkylene divalent radical;
$X_1$ and $X_2$ are, independently a linkage selected from the group consisting of a direct bond,

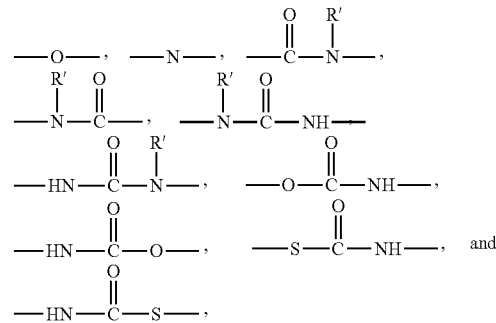

wherein R' is H or $C_1$-$C_8$ alkyl;
$L_1$ and $L_2$ are, independently,

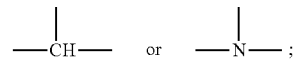

PDMS is a polysiloxane divalent radical of formula (3)

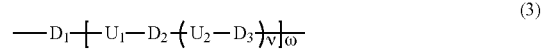

wherein v is 0 or 1, ω is an integer of from 0 to 5;
$U_1$ and $U_2$ are, independently, a divalent radical of —$R^{11}$—$X^3$-E-$X^4$—$R'^{11}$— wherein $R^{11}$ and $R'^{11}$ are, independently, a linear or branched $C_1$-$C_{10}$ alkylene divalent radical, $X^3$ and $X^4$ independent of each other are a linkage selected from the group consisting of

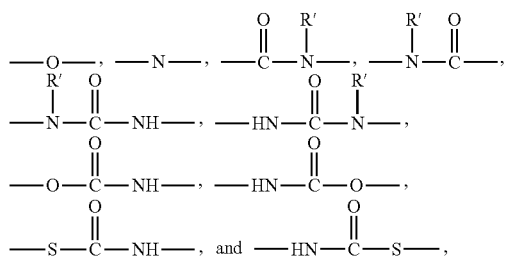

wherein R' is H or $C_1$-$C_8$ alkyl, E is an alkyl diradical, a cycloalkyl diradical, an alkylcycloalkyl diradical, an alkylaryl diradical, or an aryl diradical with 1 to 40 carbon atoms and optionally have an ether, thio, or amine linkage in the main chain;

$D_1$, $D_2$ and $D_3$ are, independently, a divalent group of formula (1):

(1)

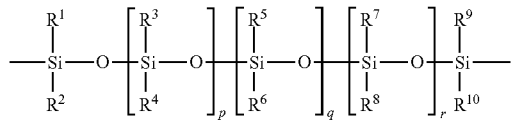

wherein $R^1$ to $R^{10}$ are, independently, $C_1$-$C_8$-alkyl, $C_1$-$C_4$ alkyl- or $C_1$-$C_4$-alkoxy-substituted phenyl, fluoro($C_1$-$C_{18}$-alkyl), cyano($C_1$-$C_{12}$-alkyl), or -alk-, wherein alk is $C_1$-$C_6$-alkylene divalent radical, p, q and r are, independently, an integer from 0 to 700, and (p+q+r) is from 5 to 700;

$Y^1$ and $Y^2$ are, independently, a divalent radical of formula (4) or (5)

(4)

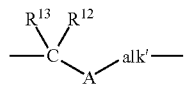

(5)

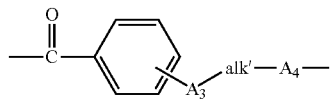

wherein $R^{12}$ and $R^{13}$ are, independently, hydrogen, $C_1$-$C_8$ alkyl, $C_1$-$C_8$ cycloalkyl, or $C_1$-$C_8$ aryl, or $R^{12}$ and $R^{13}$ together are —$(CH_2)_g$— where g is an integer from 2 to 6, alk' is a linear or branched $C_1$-$C_{10}$ alkylene divalent radical, A and $A_4$ are, independently, —O—, —NR'—, or —S—;

$A_3$ is a linkage selected from the group consisting of

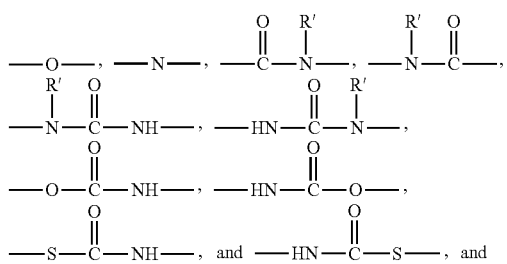

T is a monovalent hydrophilic polymer chain comprising monomer units from one or more hydrophilic vinylic monomers.

20. The method of claim 5, wherein the water-based lens-forming composition comprises a polysiloxane-containing vinylic macromer has the formula I and a polysiloxane-containing surfactant has the formula II:

CP-PAO-ALK-PDMS-ALK-PAO-CP    (I)

X-PAO-ALK-PDMS-ALK-PAO-X    (II)

where PDMS is a divalent poly(disubstituted siloxane), ALK is an alkylene or alkylenoxy group having at least 3 carbon atoms, DU is a diurethane-containing group, PAO is a divalent polyoxyalkylene of formula —$(R^aO)_n$—$(R^bO)_m$—$(R^cO)_l$— in which $R^a$, $R^b$, and $R^c$ independent of one other are ethylene (—$CH_2CH_2$—) or propylene (—$CH(CH_3)$—$CH_2$—) divalent radical and n, m, and l independent of one other is from 0 to 100, provided that the sum of n, m and l is from 3 to 100 and at least one of $R^a$, $R^b$, and $R^c$ is ethylene divalent radical, CP is an acrylate and methacrylate, and X is a non-actinically-polymerizable group.

* * * * *